United States Patent
Menon

(10) Patent No.: US 12,167,495 B2
(45) Date of Patent: Dec. 10, 2024

(54) ROAMING MOBILE DEVICE SERVICE STEERING

(71) Applicant: AT&T Intellectual Property I, L.P., Atlanta, GA (US)

(72) Inventor: Sreejith Menon, Herndon, VA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 358 days.

(21) Appl. No.: 17/653,048

(22) Filed: Mar. 1, 2022

(65) Prior Publication Data
US 2023/0284006 A1  Sep. 7, 2023

(51) Int. Cl.
  *H04W 8/02*  (2009.01)
  *H04W 48/18*  (2009.01)
  *H04W 76/10*  (2018.01)

(52) U.S. Cl.
  CPC ............ *H04W 8/02* (2013.01); *H04W 48/18* (2013.01); *H04W 76/10* (2018.02)

(58) Field of Classification Search
  CPC ........ H04W 8/02; H04W 76/10; H04W 48/18
  See application file for complete search history.

(56) References Cited

U.S. PATENT DOCUMENTS

| | | | |
|---|---|---|---|
| 10,834,571 B1* | 11/2020 | Yau | H04W 12/06 |
| 2022/0070649 A1* | 3/2022 | Sahin | H04L 65/1073 |
| 2022/0295385 A1* | 9/2022 | Xu | H04W 60/06 |

* cited by examiner

*Primary Examiner* — Curtis B Odom

(57) ABSTRACT

The disclosed technology is directed towards intelligently steering a roaming mobile communications device to a roaming carrier that is preferred by the mobile device's home network. When a mobile device requests to connect to a first visited network, decision logic of the home network determines whether the first visited network is the preferred visited network. If not, the home network returns a steer message (via the first visited network) to steer the mobile device to a preferred visited network. In one implementation, the steering decision is performed at the network edge by a home security edge protection proxy (H-SEPP) node coupled to a visiting SEPP (V-SEPP) node, which reduces hops and latency. What the home network considers preferred can be changed (e.g., dynamically) as desired by the home network. Also described is service-based steering that selects a different visited network based on a particular service requested by a mobile device.

19 Claims, 10 Drawing Sheets

ROAMING MOBILE DEVICE SERVICE STEERING

TECHNICAL FIELD

The subject application relates to wireless communications systems in general, and more particularly to cellular wireless communications of mobile communications device via a roaming carrier.

BACKGROUND

A network function if fifth generation (5G) new radio is a security edge protection proxy (SEPP), in which the role of SEPP in roaming is to have signaling traffic across operator networks transit through such security proxies, one for the visited network coupled to one for the home network. For example, SEPP is used as a proxy at the edge for authentication, authorization and other security schema between different carriers.

A typical way in which a roaming mobile communication device connects to a roaming carrier is to obtain the public land mobile networks (PLMNs) that are being broadcasted on the radio access network, and based on the mobile device's universal integrated circuit card logic, camp on the last served PLMN or the first operator PLMN (OPLMN) entry maintained on the universal integrated circuit card. This, however, may not be the roaming carrier to which the Home Network wants the roaming mobile communication device to attach.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
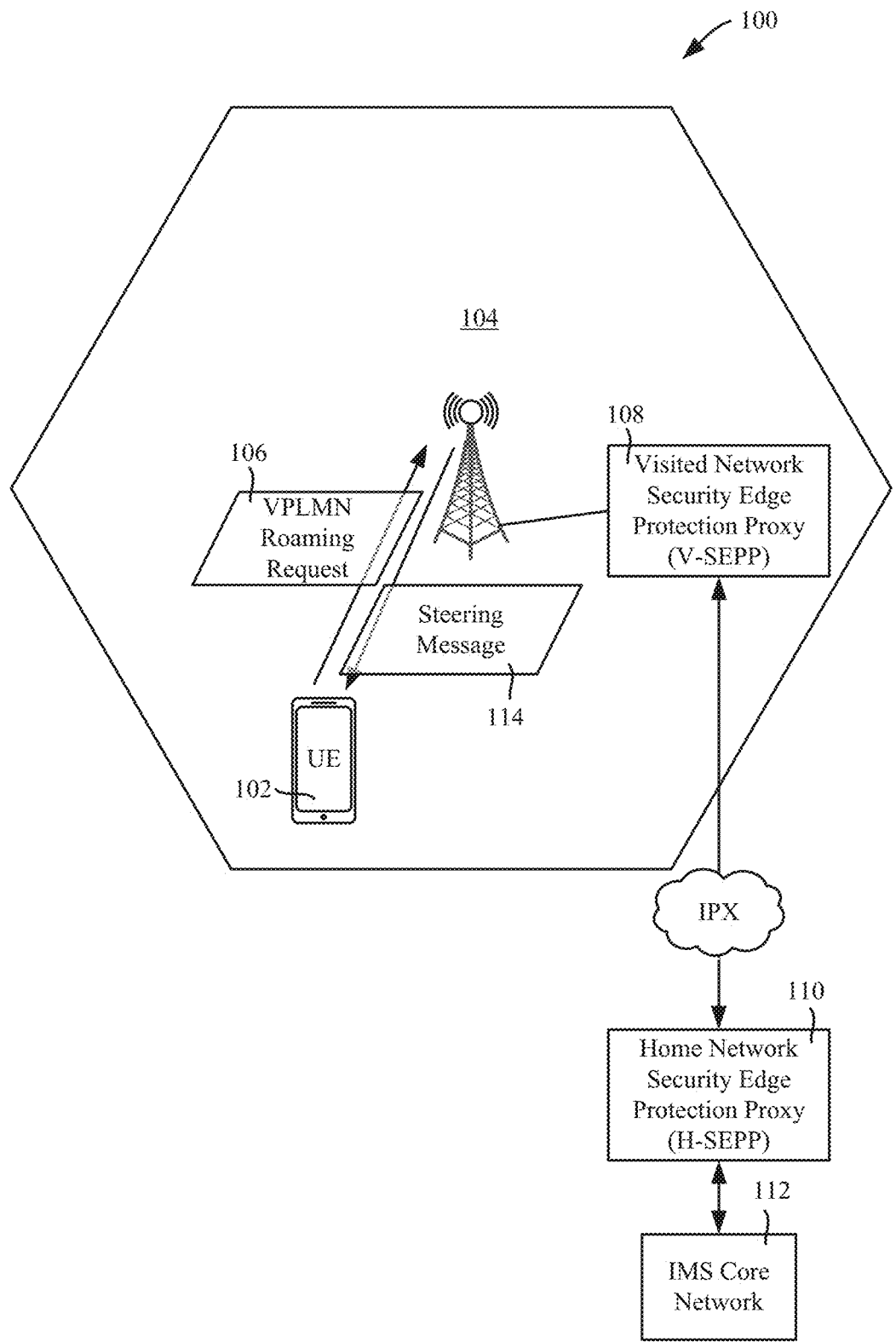
FIG. 1 is a block diagram illustrating an example wireless communication system configured for steering a user equipment device to a different visited public land roaming network, in accordance with various aspects and embodiments of the subject disclosure.

The technology described herein is generally directed towards intelligent steering logic of a home network that steers a roaming mobile communications device to a roaming carrier (visited public land mobile network, or VPLMN) preferred by the home network, based on some preference criterion or criteria. In one implementation, the home network steering logic is incorporated into a home security edge protection proxy (a fifth generation and beyond network element) with which a visited network's security edge protection proxy is communicating with respect to the roaming mobile communications device. By locating the steering logic at the edge instead of the network core, the number of hops needed for a steering decision is reduced, which reduces latency.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a mobile device (user equipment, or UE) 102 is roaming in a cell 104, such as corresponding to a roaming network device/equipment 106 in a country that is not the mobile device's home country. The roaming network device 106 broadcasts an identifier of the public land mobile network (PLMN) (the MCC+MNC), which is received by the mobile device 102.

When the mobile device 102 is roaming, the mobile device 102 scans the network for a PLMN that is being broadcast on the radio access network. When received, the device 102 requests (block 106) to connect to a matching PLMN, typically the last served PLMN or obtained from the first operator PLMN (OPLMN) entry maintained on the universal integrated circuit card. The request 106 is coupled to a visited security edge protection proxy (V-SEPP) 108 of that PLMN, which forwards the request (via internet protocol exchange, or IPX) to the home network security edge protection proxy (H-SEPP) 110, coupled to the user's (mobile device's) home IMS (IP multimedia subsystem) core network 112. Note that home security edge protection proxy 110 is already setup for edge based authentication and authorization of the mobile device 102.

As described herein, the user's home network determines whether to allow the mobile device to camp on the VPLMN (based on mobile country code and/or mobile network code) corresponding to the V-SEPP 108 for general purpose service, or to send a steering message 114 to steer the mobile device 102 to a different VPLMN that is more preferred by the home network. A particular VPLMN may be preferred by the home network for any reason, such as traffic quotas/agreements, roaming charges and so forth.

Figure 2:
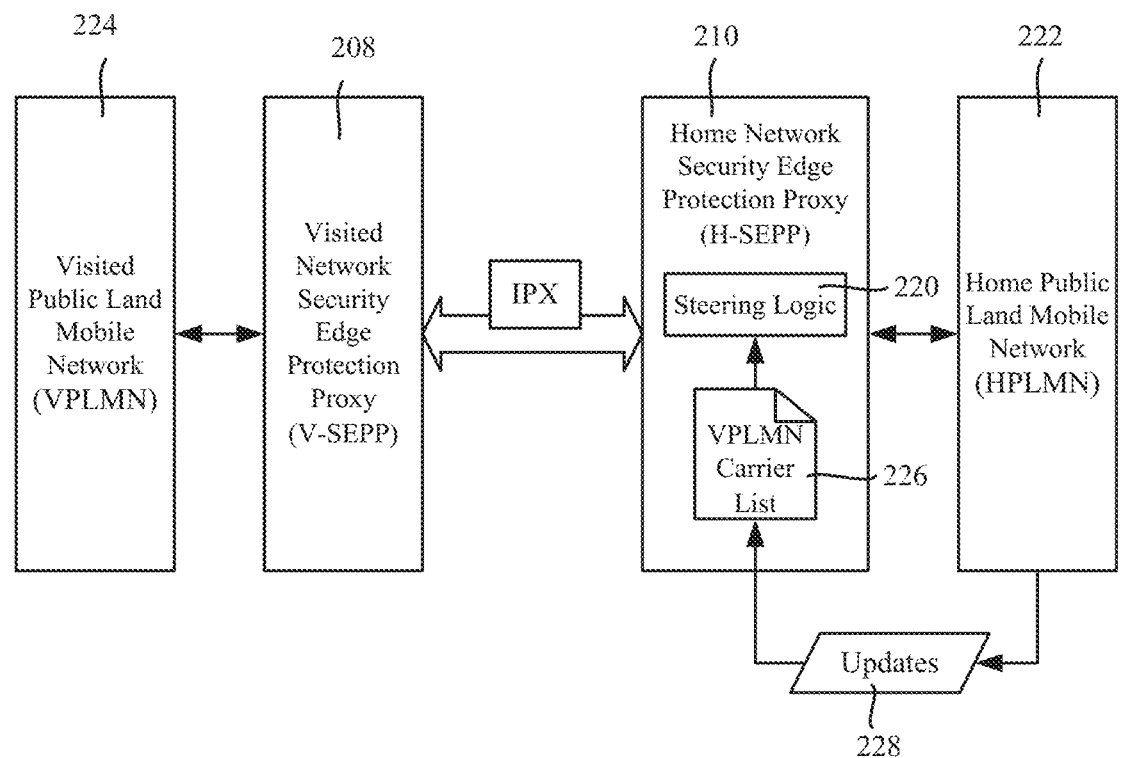
FIG. 2 is a block diagram illustrating steering logic incorporated into a home network security edge protection proxy node (network element) for potentially steering a user equipment device to a different visited public land roaming network, in accordance with various aspects and embodiments of the subject disclosure.

As shown in FIG. 2, in one implementation PLMN steering logic 220 can be incorporated into a home network security edge protection proxy (H-SEPP) network element 210 of the user's/mobile device's home public land mobile network (HPLMN). As described with reference to FIG. 1, the H-SEPP network element 210 is contacted by a visited network security edge protection proxy of a (V-SEPP) visited public land mobile network (VPLMN) 224 for authentication purposes. Note that in alternative implementations, it is feasible (but likely less efficient) to locate the steering logic at the core network or other location.

When the message from the V-SEPP is received, in addition to authentication of the mobile device and the like, the steering logic 220 accesses an edge-maintained VPLMN carrier data structure (e.g., a list) 226 to determine whether the VPLMN coupled to the V-SEPP is the preferred carrier. If so, the H-SEPP returns a message to the V-SEPP to allow the mobile device to camp on the VPLMN. If not, the H-SEPP returns a steer message to the V-SEPP to steer the mobile device to a different roaming carrier.

The VPLMN carrier data structure 226 can be in the form of an ordered list of VPLMN identifiers or the like, or can be in another form, such as an unordered list with a preference value (e.g., 1-n) associated with each listed VPLMN of a group of n VPLMNs. In any event, the steering logic 220 knows whether the current VPLMN is preferred, or whether a different VPLMN is preferred to which the mobile device is to be steered.

Significantly, in one implementation the VPLMN carrier data structure 226 can be dynamically or otherwise regularly (e.g., periodically) updated by the HPLMN. The updates (block 228) can be the entire data structure, or changes thereto.

By way of example, consider that the home network has an agreement to route some amount of its traffic (e.g., monthly) to a first roaming carrier at a first price, but that additional traffic is routed at an increased cost. Similarly, the home network can have an agreement to route its traffic to a second roaming carrier at a second price between the first price and the increased price, and so on. The first roaming carrier is thus preferred at the start of the month, but once the "quota" corresponding to the first price is reached, the second roaming carrier becomes preferred over the first roaming carrier. The cost can possibly change by the current time of day. As can be readily appreciated, in addition to cost, there may be many reasons (quality issues, customer complaints, service outages, dropped calls and the like) why available roaming carriers can be ordered by the home network based on preference, and thus the preference-based reordering of the VPLMN carrier data structure 226 is advantageous.

The technology described herein thus combines stateful and stateless logic, which can be incorporated into the H-SEPP nodes of the 5G SA architecture. The technology described herein analyzes, based on the UE signaling, whether the VPLMN to which the UE is attaching is the preferred carrier in that area. If not, the H-SEPP triggers a steering message back to the UE (via the V-SEPP that forces the UE to look for another VPLMN (FIG. 3), or indicates along with the steering message which specific VPLMN the mobile device is to look for (FIG. 4).

Figure 3:
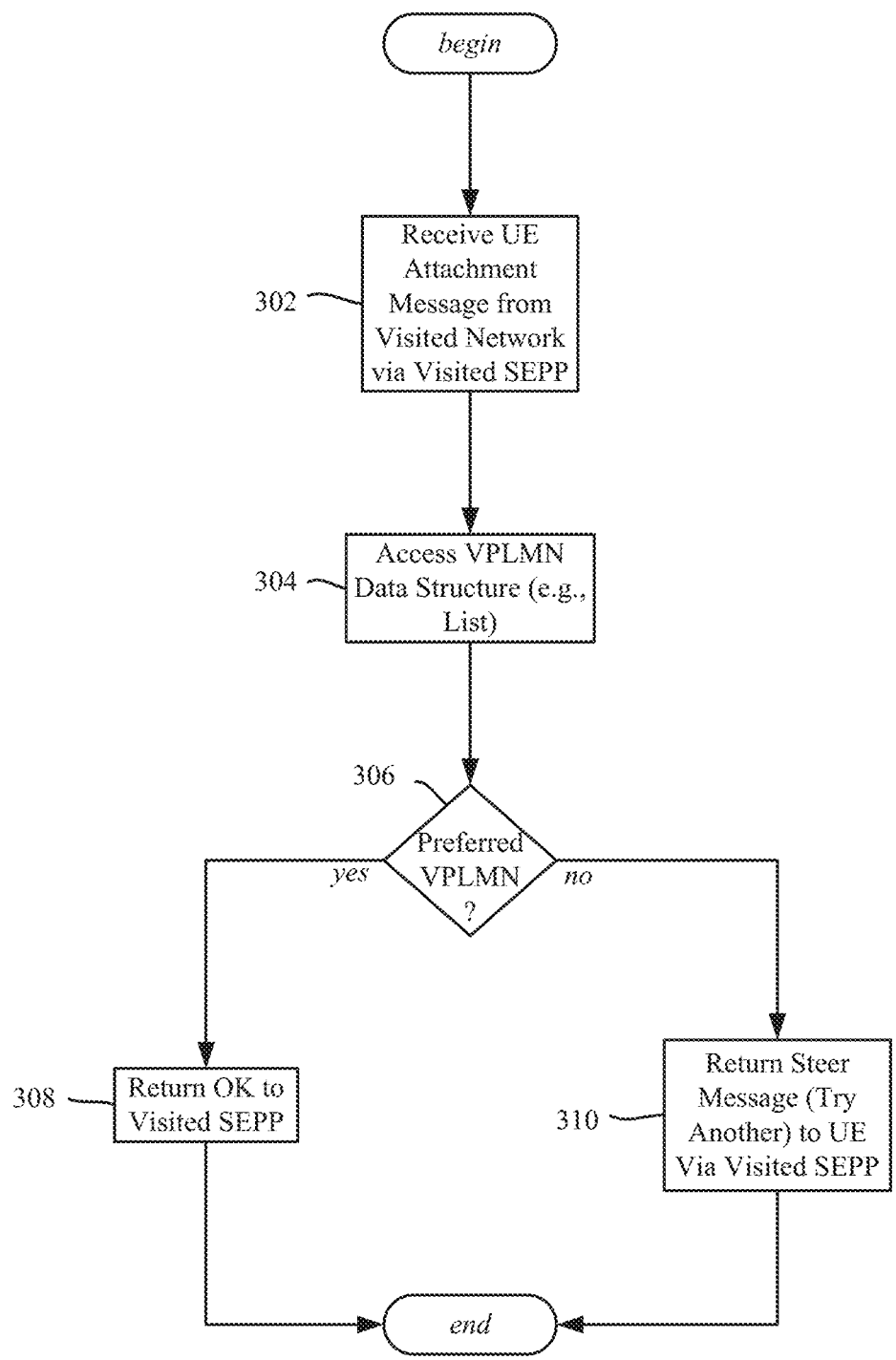
FIG. 3 is a flow diagram representing example operations of steering logic of a home network for determining whether to steer a user equipment device to a different visited public land roaming network, in accordance with various aspects and embodiments of the subject disclosure.

FIG. 3 represents one alternative implementation, in which the initial UE authentication/attachment message with respect to a roaming network is received at operation 302. That is, when the initial UE attachment message from the visited network, via its visited SEPP, is received at the home network SEPP, the home network SEPP's steering logic checks the VPLMN with the preferred VPLMN carrier data structure at operation 304. If as evaluated by operation 306 the VPLMN on which the UE device is trying to camp is the preferred VPLMN, (and assuming no issues with authentication and the like), operation 308 returns a suitable message to the visited SEPP, (shown in FIG. 3 as an "OK" message for purposes of simplicity).

If instead as evaluated by operation 306 the VPLMN on which the UE device is trying to camp is not the preferred VPLMN, (again assuming no issues with authentication and the like), operation 310 returns, from the SEPP, a steer message back to the VSEPP/VPLMN, and from there back to the UE. This steer message forces the UE to look for another carrier, (shown in FIG. 3 as a "Try Another" message for purposes of simplicity).

Figure 4:
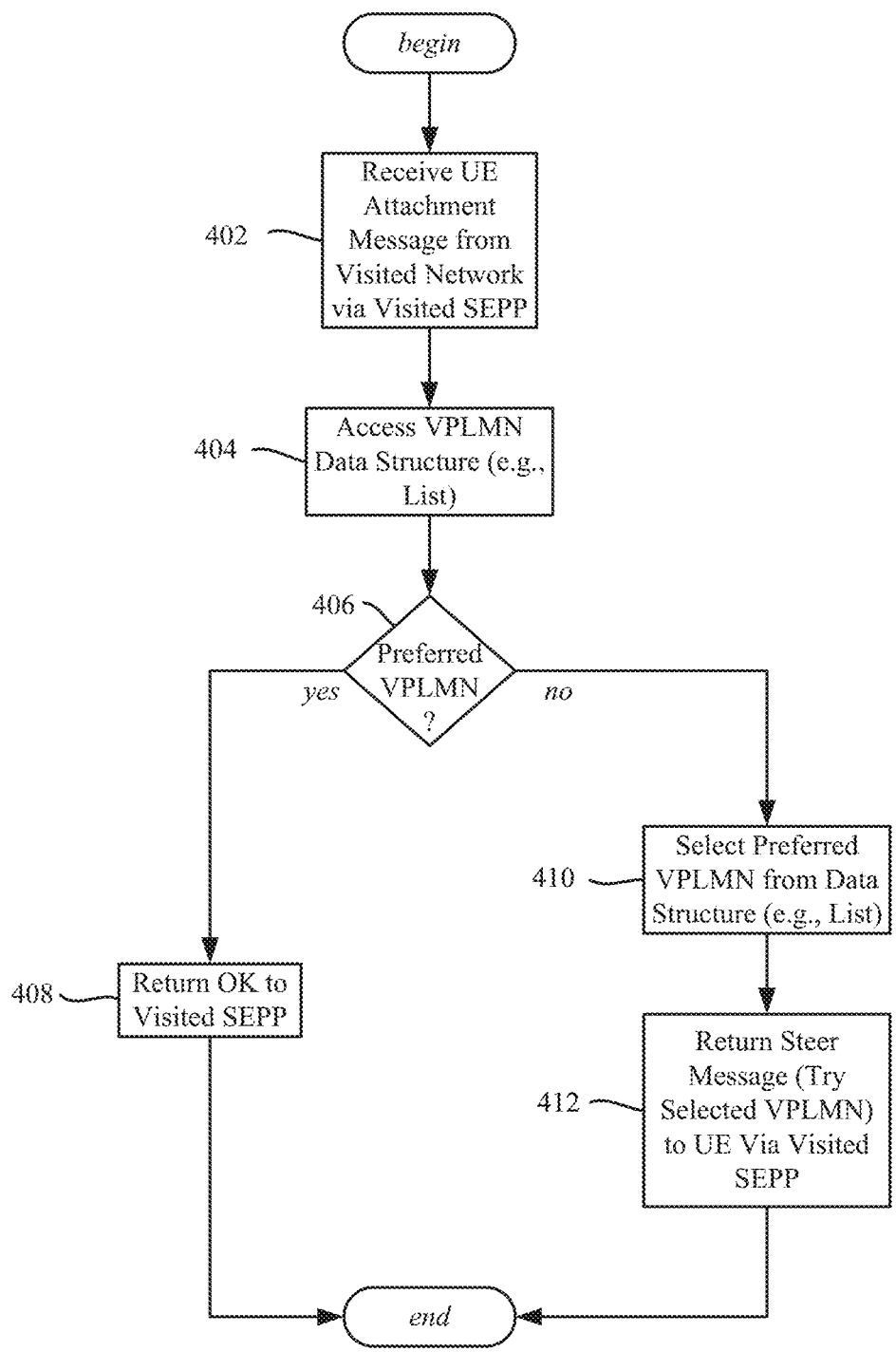
FIG. 4 is a flow diagram representing example operations of steering logic of a home network for determining whether to steer a user equipment device to a visited public land roaming network designated by the home network, in accordance with various aspects and embodiments of the subject disclosure.

FIG. 4 represents another alternative implementation, in which the initial UE attachment message from the visited network, via its visited SEPP, is received by the home SEPP at operation 402. The home SEPP's steering logic checks the VPLMN with the preferred VPLMN carrier data structure at operation 404, and if as evaluated by operation 406 the VPLMN on which the UE device is trying to camp is the preferred VPLMN, (and assuming no issues with authentication and the like), operation 408 returns a suitable message to the visited SEPP, (shown in FIG. 3 as an "OK" message for purposes of simplicity) to allow the UE device to camp on the VPLMN of the visited SEPP.

If instead as evaluated by operation 406 the VPLMN on which the UE device is trying to camp is not the preferred VPLMN, (again assuming no issues with authentication and the like), operation 410 selects the preferred VPLMN from the VPLMN preference data structure. Operation 412 sends, from the SEPP, a steer message back to the VSEPP/VPLMN, and from there back to the UE. This alternative steer message instructs the UE to look for a specific other roaming carrier, (shown in FIG. 4 as a "Try Selected VPLMN" message for purposes of simplicity).

To summarize, in the alterative described with reference to FIG. 4, rather than just sending the steer message and forcing the UE to look for other VPLMN to attach (as in FIG. 3), the home SEPP can send the preferred VPLMN on the list back to the UE device as part of the steer message. When the steer message is received, the UE can try to attach directly to that specific VPLMN.

Moreover, note that instead of a single VPLMN, a ranked set of two or more VPLMNs can be returned at operation 412 (if appropriate for a given roaming area). The multiple VPLMN set allows the UE to match the highest-ranked VPLMN with the group of VPLMNs that are currently being broadcasted. In this way, for example, if the highest ranked VPLMN is not available to provide service for whatever reason, the UE device can attempt to match the next highest-ranked VPLMN to communicate with its SEPP, and so on. If the home SEPP receives a secondary message from the UE that is from a V-SEPP lower than the highest-ranked VPLMN's V-SEPP, the home SEPP recognizes that something is wrong with the higher-ranked VPLMN(s) and can allow the roaming connection to that lower-ranked VPLMN, and/or take other action to determine the issue.

Figure 5:
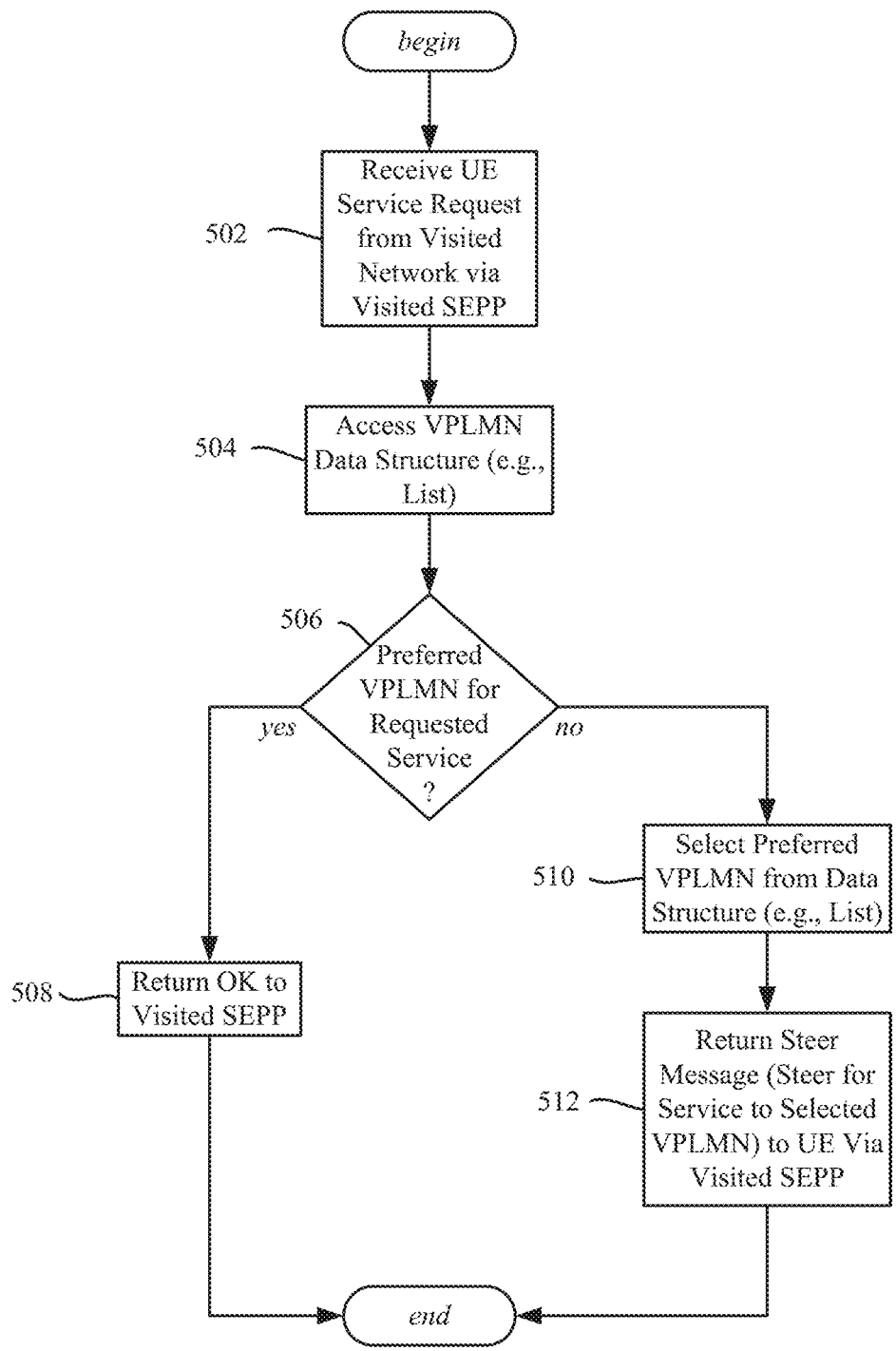
FIG. 5 is a flow diagram representing example operations of steering logic of a home network for determining, based on a service request of a user equipment device, whether to steer the user equipment device to different visited public land roaming network, in accordance with various aspects and embodiments of the subject disclosure.

FIG. 5 represents another steering concept, namely changing the UE device attachment after (post) the initial UE attachment to a VPLMN for a specific service. For example, consider that the UE device successfully camps on a VPLMN-A. However, consider that a service is being invoked by the device that the home carrier does not consider a good/preferred roaming agreement with VPLMN-A with respect to this particular service, but has a preferred carrier VPLMN-B for this service. The technology described herein can, for a service, selectively steer the UE to the preferred carrier VPLMN-B.

By way of a more particular example, consider that the UE device camped on VPLMN-A is attempting to initiate IR94 or high priority video calling, or some mission critical service. The home carrier has a good or better agreement (e.g., based on agreements, roaming charges and the like) for this particular service and/or QCI (quality of service or QoS class identifier) with VPLMN-B. Then as part of the service initiation by the device to the VPLMN-A to the home SEPP, the home SEPP will evaluate the service tag and return a "steer for service with VPLMN-B" message back to the UE. This will force the UE to try and camp on VPLMN-B for invoking this service. As can be understood, such service-based steering also can be used to ensure that a specific service uses a "gold standard operator" rather than use a single partner for all services, e.g., video over 5G with VPLMN-A, higher QoS calls with VPLMN-B, and so forth.

To summarize, at operation 502 of FIG. 5, post the initial UE attachment, a UE service is requested that the visited SEPP indicates to the home SEPP as part of service-based architecture authorization. At operations 504 and 506 the home SEPP checks whether the specific service being invoked via the current VPLMN is the top-ranked VPLMN for this service; if so operation 508 allows the service to be invoked. If not, then via operations 510 and 512 the home SEPP forces a "steer for service tag message" or the like indicating that this specific service is to be steered to VPLMN-B for this service initiation. Forcing the device to look for VPLMN-B. Again, it is feasible to simply have the UE device try a different VPLMN for this service, or to return more than one different VPLMN for this service, e.g., ranked in the order to try.

Figure 6:
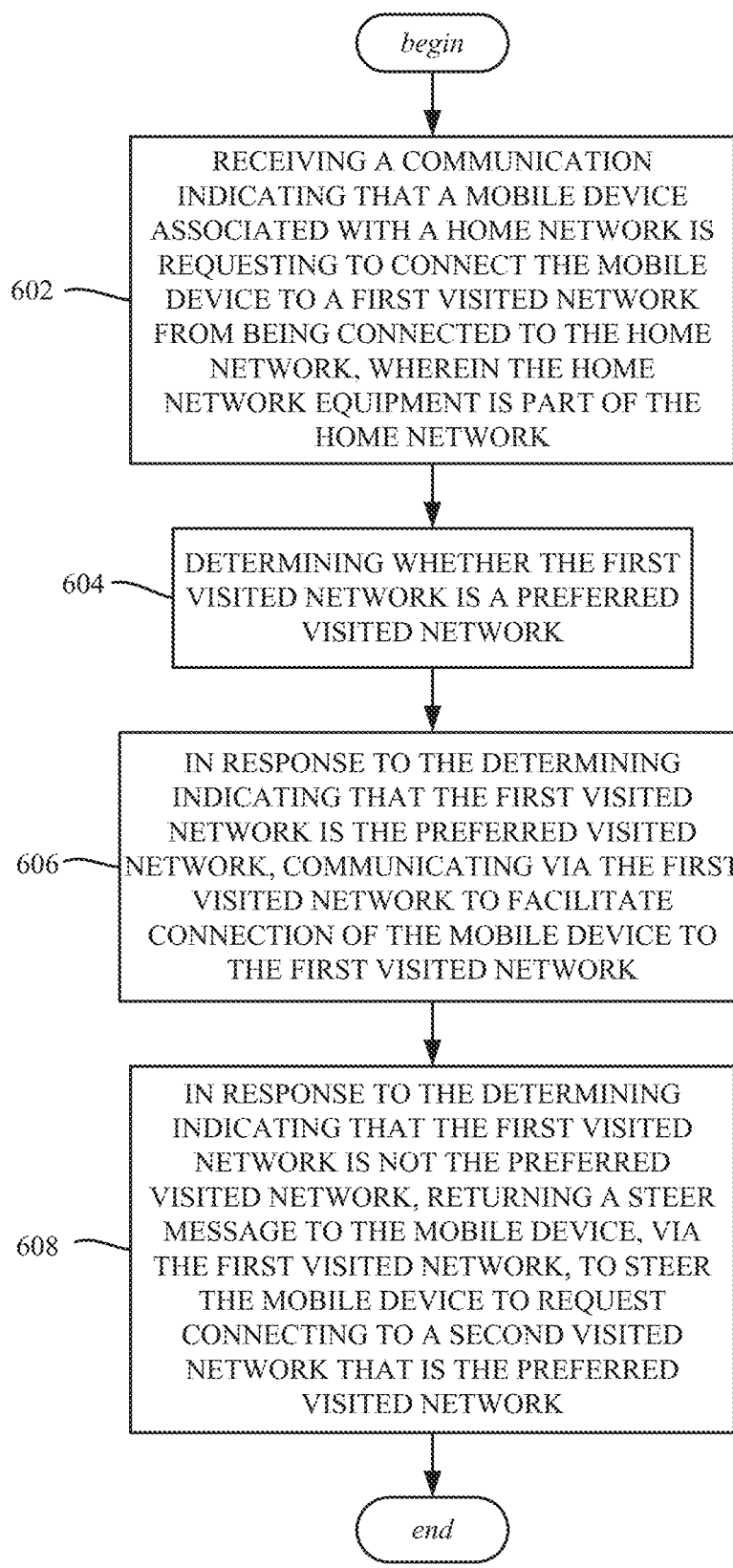
FIG. 6 is a flow diagram representing example operations related to determining, at a home network, whether to steer a user equipment device to a different visited public land roaming network, in accordance with various aspects and embodiments of the subject disclosure.

One or more example aspects are represented in FIG. 6, and can correspond to a home network equipment of a home network, comprising a processor, and a memory that stores executable instructions that, when executed by the processor, facilitate performance of operations. Example operation 602 represents receiving a communication indicating that a mobile device associated with the home network is requesting to connect the mobile device to a first visited network from being connected to the home network, wherein the home network equipment is part of the home network. Example operation 604 represents determining whether the first visited network is a preferred visited network. Example operation 606 represents, in response to the determining indicating that the first visited network is the preferred visited network, communicating via the first visited network to facilitate connection of the mobile device to the first visited network. Example operation 608 represents, in response to the determining indicating that the first visited network is not the preferred visited network, returning a steer message to the mobile device, via the first visited network, to steer the mobile device to request connecting to a second visited network that is the preferred visited network.

The steer message can instruct the mobile device to request connecting to the second visited network as selected by the mobile device.

The steer message can identify the second visiting network, as selected by the home network equipment, and can instruct the mobile device to request connecting to the second visiting network. The steer message can include an ordered list of visited public land mobile networks.

Further operations can include selecting the second visiting network from a ranked group of preferred visiting networks. Selecting the second visiting network can be based on at least one of first service agreement data between the home network and the first visited network, or second service agreement data between the home network and the second visited network.

Further operations can include reordering the ordered group based on changed condition data. The changed condition data can include a first value representing first traffic of mobile devices of the home network controlled via the first visited network, and a second value representing second traffic of the mobile devices of the home network controlled via the second visited network.

Determining whether the first visited network is the preferred visited network can be performed by a security edge protection proxy network element of the home network equipment.

Figure 7:
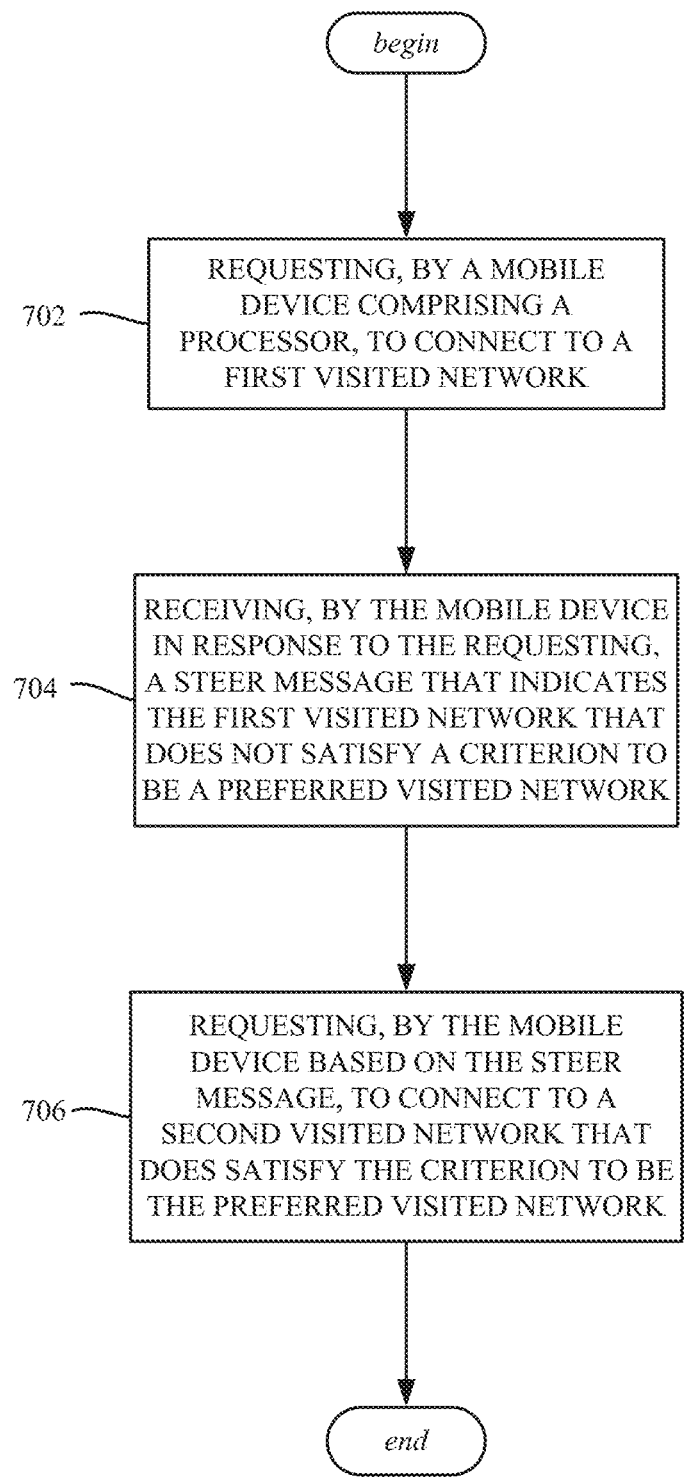
FIG. 7 is a flow diagram representing example operations of a mobile device to request connection to a different visited public land roaming network based on a steer message, in accordance with various aspects and embodiments of the subject disclosure.

One or more example aspects are represented in FIG. 7, and can correspond to operations, e.g., of a method. Operation 702 represents requesting, by a mobile device comprising a processor, to connect to a first visited network. Operation 704 represents receiving, by the mobile device in response to the requesting, a steer message that indicates the first visited network that does not satisfy a criterion to be a preferred visited network. Operation 706 represents requesting, by the mobile device based on the steer message, to connect to a second visited network that does satisfy the criterion to be the preferred visited network.

Receiving the steer message can include receiving data that identifies the second visited network as the preferred visited network.

The steer message may not identify the preferred visited network, and further operations can include selecting, by the mobile device based on the steer message, the second visited network as the preferred visited network.

The steer message can be a first steer message, and further operations can include connecting, by the mobile device, via the second visited network, requesting, by the mobile device, a different service via the second visited network than a service currently provided via the second visited network, in response to the requesting the different service, receiving a second steer message via the second visited network, and connecting, by the mobile device based on the second steer message, via a third visited network to provide the different service.

Figure 8:
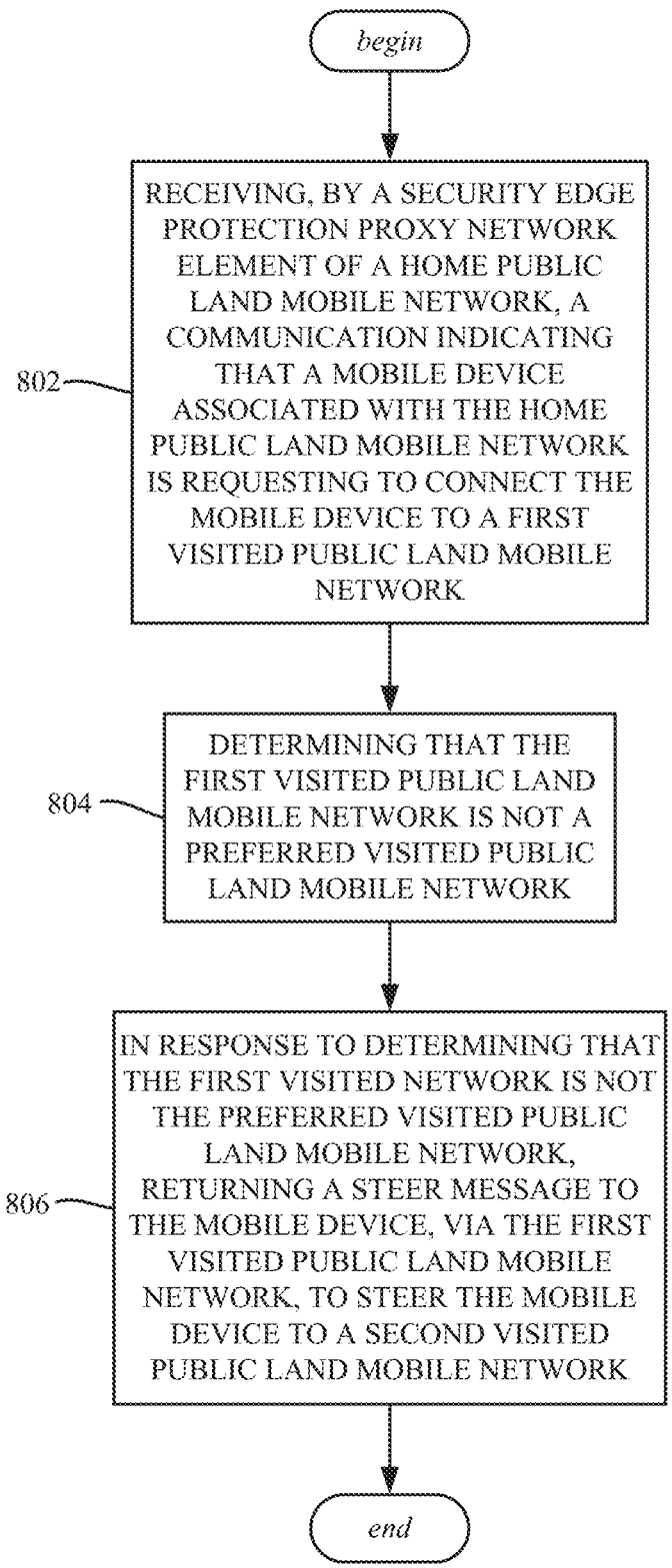
FIG. 8 is a flow diagram representing example operations of a security edge protection proxy network element to steer a mobile device to a different visited public land roaming network, in accordance with various aspects and embodiments of the subject disclosure.

One or more aspects are represented in FIG. 8, such as implemented in a machine-readable medium, comprising executable instructions that, when executed by a processor of a mobile device, facilitate performance of operations. Example operation 802 represents receiving, by a security edge protection proxy network element of a home public land mobile network, a communication indicating that a mobile device associated with the home public land mobile network is requesting to connect the mobile device to a first visited public land mobile network. Example operation 804 represents determining that the first visited public land mobile network is not a preferred visited public land mobile network. Example operation 806 represents in response to determining that the first visited network is not the preferred visited public land mobile network, returning a steer message to the mobile device, via the first visited public land mobile network, to steer the mobile device to a second visited public land mobile network.

Determining that the first visited public land mobile network is not the preferred visited public land mobile network can include evaluating, by the security edge protection proxy network element, a preference-ordered list comprising identities of preferred visited public land mobile networks.

Further operations can include reordering preference-ordered list based on change condition data.

Further operations can include selecting, by the security edge protection proxy network element, the second visited public land mobile network and returning data that identifies the second visited public land mobile network in association with the steer message.

Returning the steer message to the mobile device can include sending data to the mobile device instructing the mobile device to attempt connection to a different public land mobile network.

The communication can be a first communication, and further operations can include receiving, by the security edge protection proxy network element of the home public land mobile network, a second communication indicating that the mobile device is requesting to connect the mobile device to the second visited public land mobile network, and communicating with the second visited public land mobile network to facilitate connection of the mobile device to the second visited public land mobile network The steer message can be a first steer message, and further operations can include receiving, by the security edge protection proxy network element of the home public land mobile network, a third communication indicating that the mobile device is requesting a video-related service of the second visited public land mobile network, and, in response to the third communication, determining, based on the video-related service being requested, that a third visited public land mobile network is preferable for use with respect to the video-related service, and returning a second steer message to the mobile device, via the second visited public land mobile network, to steer the mobile device to connect to the third visited public land mobile network for communications related to the video-related service.

As can be seen, the technology described herein provides a cost effective and intelligent way to steer a UE device to a different network that is preferred in some way, such as based on the wholesale roaming settlement agreements the home operator has with partner carriers in a specific area. What a home network considers as a preferred VPLMN can vary over time based on changing conditions, and the technology described herein facilitates adapting to such changing conditions by preference-based reordering of VPLMNs as needed. Further, service-based steering can also be employed.

In one implementation, performing the steering decision logic at the edge (SEPP) node adds value for some steering functionality that can be combined with Service Based Architecture (SBA). The ability to steer from the edge nodes instead of within the core control plane, for example, is significant in reducing the number of hops and in general the latency, while also allowing the home operator to steer intelligently for initial UE registration as well as for subsequent service initiation.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
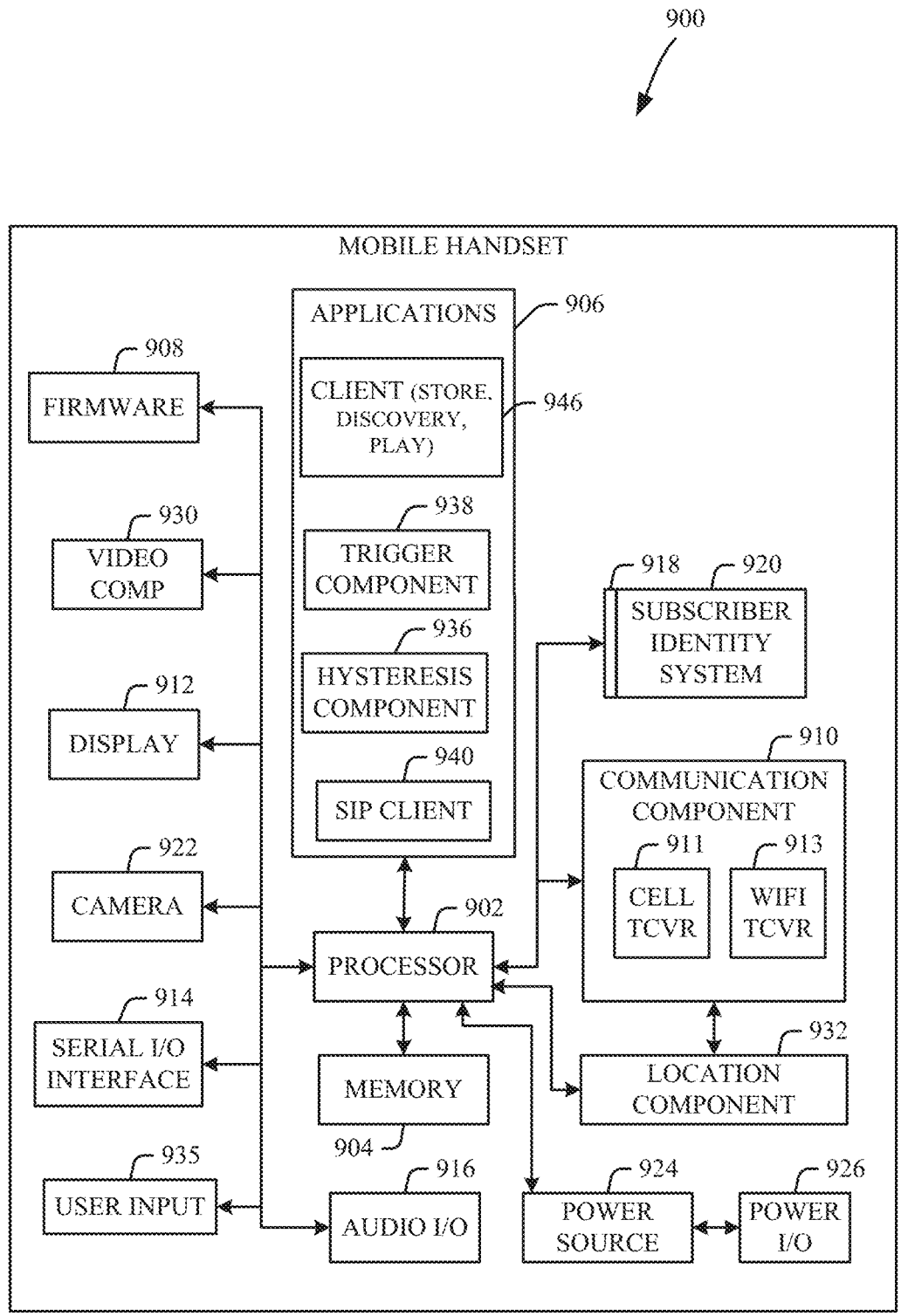
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VOIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
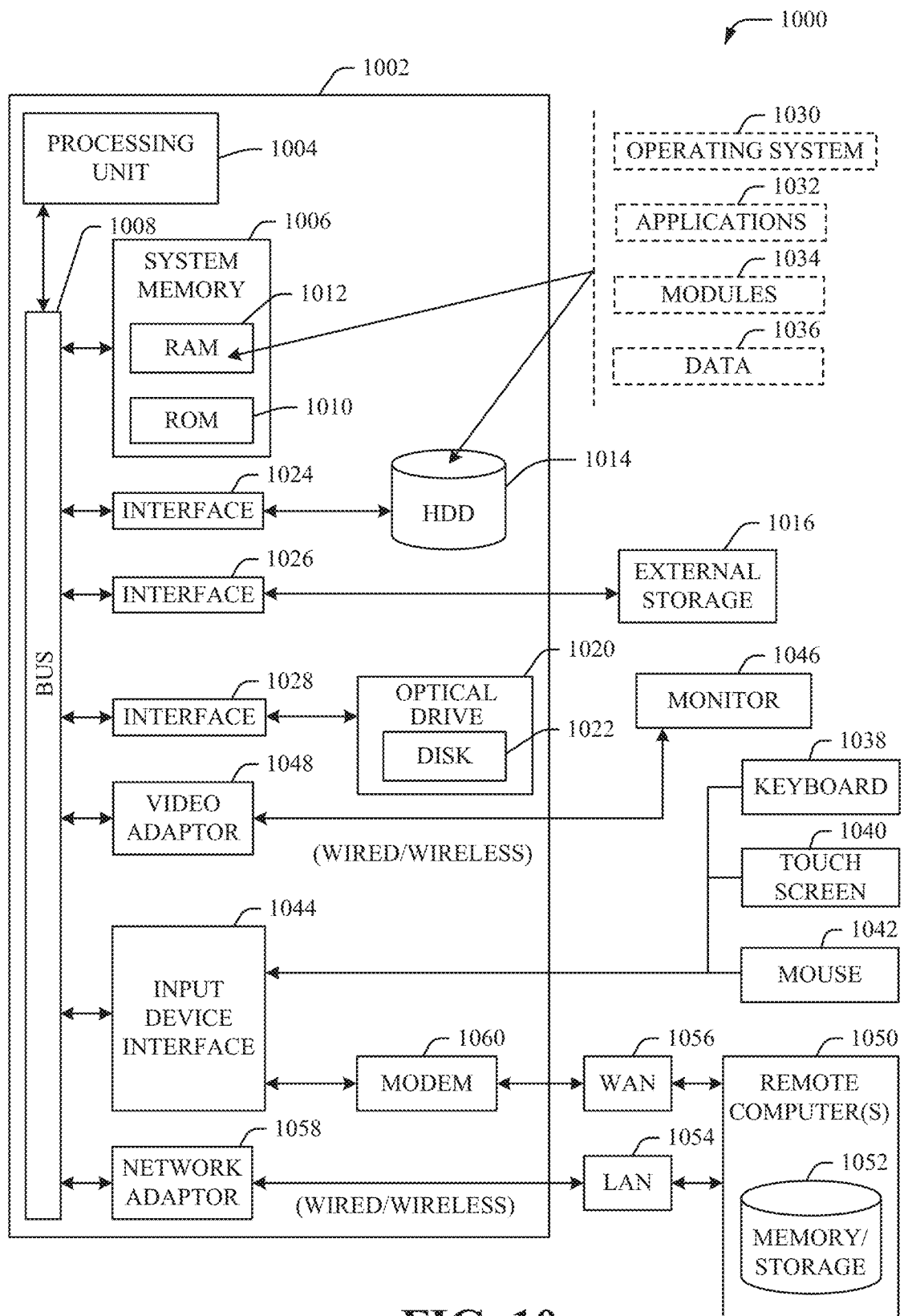
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A home network equipment of a home network, comprising:

a processor; and a memory that stores executable instructions that, when executed by the processor, facilitate performance of operations, the operations comprising:

receiving a communication indicating that a mobile device associated with the home network is requesting to connect the mobile device to a first visited network from being connected to the home network, wherein the home network equipment is part of the home network;

determining whether the first visited network is a preferred visited network;

in response to the determining indicating that the first visited network is not the preferred visited network, selecting a second visited network from an ordered group of preferred visited networks and returning a steer message to the mobile device, via the first visited network, to steer the mobile device to request connecting to the second visited network that is the preferred visited network, wherein the steer message identifies the second visited network, as selected by the home network equipment, and instructs the mobile device to request the connecting to the second visited network; and reordering the ordered group based on changed condition data.

2. The home network equipment of claim 1, wherein the steer message comprises an ordered list of visited public land mobile networks.

3. The home network equipment of claim 1, wherein selecting the second visited network is based on at least one of: first service agreement data between the home network and the first visited network, or second service agreement data between the home network and the second visited network.

4. The home network equipment of claim 1, wherein the changed condition data comprises a first value representing first traffic of mobile devices of the home network controlled via the first visited network, and a second value representing second traffic of the mobile devices of the home network controlled via the second visited network.

5. The home network equipment of claim 1, wherein the determining whether the first visited network is the preferred visited network is performed by a security edge protection proxy network element of the home network equipment.

6. The home network equipment of claim 1, the operations further comprising:

receiving a second communication indicating that the mobile device associated with the home network is requesting a different service via the second visited network than a service currently provided via the second visited network; and in response to the requesting the different service, returning a second steer message to the mobile device, via the second visited network, to steer the mobile device to request connecting to a third visited network.

7. The home network equipment of claim 6, wherein the different service comprises a video-related service.

8. A method, comprising:

requesting, by a mobile device comprising a processor, to connect to a first visited network;

receiving, by the mobile device in response to the requesting, a steer message that indicates the first visited network that does not satisfy a criterion to be a preferred visited network, wherein the steer message is a first steer message;

requesting, by the mobile device based on the steer message, to connect to a second visited network that does satisfy the criterion to be the preferred visited network;

connecting, by the mobile device, via the second visited network;

requesting, by the mobile device, a different service via the second visited network than a service currently provided via the second visited network;

in response to the requesting the different service, receiving a second steer message via the second visited network; and connecting, by the mobile device based on the second steer message, via a third visited network to provide the different service.

9. The method of claim 8, wherein the receiving the steer message comprises receiving data that identifies the second visited network as the preferred visited network.

10. The method of claim 8, wherein the steer message does not identify the preferred visited network, and further comprising selecting, by the mobile device based on the steer message, the second visited network as the preferred visited network.

11. The method of claim 8, wherein the different service comprises a video-related service.

12. The method of claim 8, wherein the second visited network is selected from an ordered group of preferred visited networks.

13. The method of claim 12, wherein the ordered group of preferred visited networks is reordered based on changed condition data.

14. The method of claim 13, wherein the changed condition data comprises first traffic of mobile devices controlled via the first visited network, and second traffic of mobile devices controlled via the second visited network.

15. A non-transitory machine-readable medium, comprising executable instructions that, when executed by a processor, facilitate performance of operations, the operations comprising:

receiving, by a security edge protection proxy network element of a home public land mobile network, a communication indicating that a mobile device associated with the home public land mobile network is requesting to connect the mobile device to a first visited public land mobile network;

determining that the first visited public land mobile network is not a preferred visited public land mobile network, wherein the determining that the first visited public land mobile network is not the preferred visited public land mobile network comprises evaluating, by the security edge protection proxy network element, a preference-ordered list comprising identities of preferred visited public land mobile networks; and in response to determining that the first visited public land mobile network is not the preferred visited public land mobile network, returning a steer message to the mobile device, via the first visited public land mobile network, to steer the mobile device to a second visited public land mobile network; and reordering the preference-ordered list based on change condition data.

16. The non-transitory machine-readable medium of claim 15, wherein the operations further comprise selecting, by the security edge protection proxy network element, the second visited public land mobile network and returning data that identifies the second visited public land mobile network in association with the steer message.

17. The non-transitory machine-readable medium of claim 15, wherein the returning the steer message to the mobile device comprises sending data to the mobile device instructing the mobile device to attempt connection to a different public land mobile network.

18. The non-transitory machine-readable medium of claim 15, wherein the communication is a first communication, and wherein the operations further comprise receiving, by the security edge protection proxy network element of the home public land mobile network, a second communication indicating that the mobile device is requesting to connect the mobile device to the second visited public land mobile network, and communicating with the second visited public land mobile network to facilitate connection of the mobile device to the second visited public land mobile network.

19. The non-transitory machine-readable medium of claim 18, wherein the steer message is a first steer message, and wherein the operations further comprise receiving, by the security edge protection proxy network element of the home public land mobile network, a third communication indicating that the mobile device is requesting a video-related service of the second visited public land mobile network, and, in response to the third communication, determining, based on the video-related service being requested, that a third visited public land mobile network is preferable for use with respect to the video-related service, and returning a second steer message to the mobile device, via the second visited public land mobile network, to steer the mobile device to connect to the third visited public land mobile network for communications related to the video-related service.

* * * * *